United States Patent
Soderstrom

(10) Patent No.: US 10,991,015 B2
(45) Date of Patent: Apr. 27, 2021

(54) CONSUMER CONTROLLED PORTFOLIO CHARITABLE GIVING SYSTEM

(71) Applicant: Change Up Inc., Wilmington, DE (US)

(72) Inventor: Robert W Soderstrom, Los Angeles, CA (US)

(73) Assignee: Change Up Inc., Wilmington, DE (US)

( * ) Notice: Subject to any disclaimer, the term of this patent is extended or adjusted under 35 U.S.C. 154(b) by 1 day.

(21) Appl. No.: 16/533,445

(22) Filed: Aug. 6, 2019

(65) Prior Publication Data

US 2020/0043062 A1    Feb. 6, 2020

Related U.S. Application Data

(63) Continuation-in-part of application No. 16/532,874, filed on Aug. 6, 2019, and a continuation-in-part of application No. 15/181,781, filed on Jun. 14, 2016, which is a continuation-in-part of application No. 14/625,612, filed on Feb. 18, 2015, now abandoned, which is a continuation-in-part of application No. 13/738,949, filed on Jan. 10, 2013, now abandoned.

(60) Provisional application No. 62/851,452, filed on May 22, 2019, provisional application No. 61/610,912, filed on Mar. 14, 2012, provisional application No. 61/585,075, filed on Jan. 10, 2012.

(51) Int. Cl.
*G06Q 30/02* (2012.01)
*G06Q 40/02* (2012.01)
*G06Q 20/10* (2012.01)

(52) U.S. Cl.
CPC ....... *G06Q 30/0279* (2013.01); *G06Q 20/108* (2013.01); *G06Q 40/02* (2013.01)

(58) Field of Classification Search
CPC ........ G06Q 10/00; G06Q 20/00; G06Q 30/00; G06Q 40/00; G06Q 30/0279; G06Q 20/108; G06Q 40/02
USPC ................................................ 705/12, 3–44
See application file for complete search history.

(56) References Cited

U.S. PATENT DOCUMENTS

| | | |
|---|---|---|
| 5,546,303 A | 8/1996 | Helbling |
| 6,112,191 A | 8/2000 | Burke |
| 6,876,971 B1 | 4/2005 | Burke |
| 7,571,849 B2 | 8/2009 | Burke |

(Continued)

OTHER PUBLICATIONS

"Emirates Bank Adds du to its Online Payments Options", Proquest ID: 194842595, Publication info: Al Bawaba, London Jun. 28, 2007.*

(Continued)

*Primary Examiner* — Frantzy Poinvil
(74) *Attorney, Agent, or Firm* — Grumbles Law PLLC; Stephen F. Wolf; Brittany Nanzig

(57) ABSTRACT

The provided donation facilitation system can allow a donor, such as a customer, to challenge another entity, such as a retailer, to make a retailer contribution to a portfolio of multiple charities set up by the donor upon, for example, the purchase of a good or service from the retailer. The provided portfolio donation facilitation system can allow the other entity such as a retailer to create its own retailer portfolio of vetted multiple charities and make an retailer contribution to a customer's portfolio of vetted multiple charities when at least one component of the retailer's portfolio of vetted multiple charities matches at least one component of the customer's portfolio of vetted multiple charities.

17 Claims, 9 Drawing Sheets

(56) References Cited

U.S. PATENT DOCUMENTS

| | | | |
|---|---|---|---|
| 8,010,450 B2* | 8/2011 | Palmer | G06Q 20/10 705/39 |
| 8,025,217 B2 | 9/2011 | Burke | |
| 8,160,922 B2 | 4/2012 | Postrel | |
| 8,214,287 B1 | 7/2012 | Garfield | |
| 8,478,661 B1 | 7/2013 | Kressler | |
| 8,484,142 B2 | 7/2013 | Pinckney et al. | |
| 8,615,445 B2* | 12/2013 | Dorsey | G06Q 20/24 705/26.1 |
| 8,635,137 B2 | 1/2014 | Carrette et al. | |
| 8,639,619 B1* | 1/2014 | Priebatsch | G06Q 20/322 705/39 |
| 8,725,597 B2* | 5/2014 | Mauseth | G06Q 30/0201 705/28 |
| 8,763,896 B2* | 7/2014 | Kushevsky | G06Q 20/3672 235/379 |
| 9,245,231 B2 | 1/2016 | Pinckney et al. | |
| 9,754,294 B2* | 9/2017 | Hosny | G06Q 30/0279 |
| 2005/0021363 A1 | 1/2005 | Stimson et al. | |
| 2005/0167483 A1 | 8/2005 | Burke | |
| 2005/0171849 A1 | 8/2005 | Brissette | |
| 2006/0231608 A1* | 10/2006 | Gorelick | G06Q 20/381 235/379 |
| 2006/0235713 A1 | 10/2006 | Tobler et al. | |
| 2006/0259424 A1 | 11/2006 | Turcotte et al. | |
| 2007/0061252 A1 | 3/2007 | Burke | |
| 2008/0222029 A1 | 9/2008 | Poster | |
| 2010/0312650 A1 | 12/2010 | Pinckney et al. | |
| 2011/0047035 A1 | 2/2011 | Gidwani et al. | |
| 2011/0078050 A1 | 3/2011 | Schwartz | |
| 2012/0047009 A1 | 2/2012 | Turner et al. | |
| 2012/0185314 A1 | 7/2012 | Postrel | |
| 2013/0246145 A1* | 9/2013 | Ringewald | G06Q 20/227 705/14.23 |
| 2013/0268432 A1 | 10/2013 | Kressler | |
| 2014/0129435 A1* | 5/2014 | Pardo | G06Q 20/227 705/41 |
| 2014/0156442 A1* | 6/2014 | Cushing | G06Q 30/08 705/26.4 |
| 2014/0365285 A1 | 12/2014 | Bahna et al. | |
| 2014/0372319 A1* | 12/2014 | Wolovitz | G06Q 20/3829 705/71 |
| 2015/0006426 A1 | 1/2015 | Sobhani et al. | |
| 2015/0127530 A1* | 5/2015 | Wick | G06Q 20/3223 705/39 |
| 2015/0332314 A1 | 11/2015 | Chakraborty et al. | |
| 2015/0348014 A1* | 12/2015 | Van Os | G06Q 30/0631 705/41 |
| 2015/0348018 A1* | 12/2015 | Campos | G06Q 20/18 705/41 |

OTHER PUBLICATIONS

Go Daddy Operating Company, LLC; Round Up for Charity; Jul. 6, 2011; http://www.godaddy.com/charity/roundupforcharity.aspx?ci=46641.

Elliot Silver; Go Daddy Checkout Option: "Round Up and Give to Hope for Haiti"; Apr. 15, 2011; http://www.elliotsblog.com/go-daddy-round-up-and-give-to-hope-for-haiti-1990.

Bank of America Corporation; The Keep the Change program makes savings automatic; 2013; http://www.bankofamerica.com/promos/jump/ktc_coinjar/index.cfm?&statecheck=MN.

Yelp; Tokens at Whole Foods? San Francisco, Yelp Local Questions & Answers; Jan. 20, 2007; www.yelp.com/topic/san-francisco-tokens-at-whole-foods.

Poinvil, Frantzy; Non-Final Office Action for U.S. Appl. No. 13/738,949; USPTO Communication; dated Dec. 12, 2013. 8 pp.

Poinvil, Frantzy; Final Office Action for U.S. Appl. No. 13/738,949; USPTO Communication; dated Aug. 18, 2014. 7 pp.

Poinvil, Frantzy; Non-Final Office Action for U.S. Appl. No. 14/625,612; USPTO Communication; dated Jun. 2, 2015. 7 pp.

Poinvil, Frantzy; Final Office Action for U.S. Appl. No. 14/625,612; USPTO Communication; dated Jan. 20, 2016. 10 pp.

Poinvil, Frantzy; Non-Final Office Action for U.S. Appl. No. 15/181,781; USPTO Communication; dated Aug. 24, 2018. 8 pp.

Poinvil, Frantzy; Final Office Action for U.S. Appl. No. 15/181,781; USPTO Communication; dated Feb. 15, 2019. 7 pp.

* cited by examiner

CONSUMER CONTROLLED PORTFOLIO CHARITABLE GIVING SYSTEM

CROSS REFERENCE TO RELATED APPLICATIONS

This application is a continuation-in-part of U.S. patent application Ser. No. 15/181,781, filed Jun. 14, 2016, titled METHOD AND SYSTEM FOR FACILITATING DONATIONS, which is a continuation-in-part of U.S. patent application Ser. No. 14/625,612, filed Feb. 18, 2015, titled GAMING SYSTEM FOR FACILITATING COMPETITION BETWEEN FUNDRAISING CAMPAIGNS, which in turn is a continuation-in-part of U.S. patent application Ser. No. 13/738,949, filed Jan. 10, 2013 titled MOBILE APPLICATION FACILITATING MONETARY OR OTHER DONATIONS, which in turn claims the benefit of U.S. Provisional Pat. App. Ser. No. 61/610,912, filed Mar. 14, 2012 titled MOBILE APPLICATION FACILITATING MONETARY OR OTHER DONATIONS, and U.S. Provisional Pat. App. Ser. No. 61/585,075, filed Jan. 10, 2012 titled MOBILE APPLICATION FACILITATING MONETARY OR OTHER DONATIONS. This application also is a continuation-in-part of U.S. patent application Ser. No. 16/532,874 filed on Aug. 6, 2019, titled PORTFOLIO CHARITABLE GIVING SYSTEM which in turn claims the benefit of U.S. Provisional Pat. Appl. No. 62/851,552, filed May 22, 2019, with the same title. All of these applications are herein incorporated by reference in their entirety.

FIELD

The present disclosure relates to applications for electronic devices that enable donors to challenge retailers or other entities to make charitable contributions to charities of the donor's choice.

BACKGROUND

Charitable or philanthropic giving has been around for a long time. A main challenge for charitable organizations is to raise funds for their causes. Fundraising is expensive and requires a significant marketing effort. This is particularly problematic for small, relatively local charities—many of which, although they provide funding to areas popular with charitable donors, may be relatively unknown. Additionally, it is difficult for donors or customers to give to two or more charities at one time. Typically, the donors need to find each charity on separate websites and give either a one-time or a recurring donation to each charity. More recently, with the advent of portable electronic devices such as smart phones and tablets, charitable giving has been facilitated using applications that enable donors to give electronically. Systems are also known for small investors that allow them to utilize electronic devices to create and manage, on a cost-effective basis, a complex portfolio of securities, based upon the preferences of the investor. These systems can then initiate trades of the portfolio as a whole or in part in order to facilitate the wants and needs of the small investor.

Today, when a potential charitable donor researches a charity on the internet (or by other means), that donor typically visits many different websites collecting information which might not provide answers to them to make informed decisions on their donation. The landscape for charitable giving is fragmented with many single but different ways for the donor to give.

SUMMARY OF THE INVENTION

There is a need for a portfolio facilitation system that allows a donor, such as a customer, to challenge another entity, such as a retailer, to make an retailer contribution to a portfolio of multiple charities set up by the donor upon, for example, the purchase of a good or service from the retailer. There is also a need for a portfolio facilitation system that allows the other entity such as a retailer to create its own retailer portfolio of vetted multiple charities and make an retailer contribution to a customer's portfolio of vetted multiple charities when at least one member of the retailer's portfolio of vetted multiple charities matches at least one member of the customer's portfolio of vetted multiple charities.

In one aspect, a donation facilitation system is provided that includes a server programmed and configured to host a payment system. The system can also include a mobile device of a customer configured to present the customer an opportunity to make an electronic payment into the payment system of a price charged by a retailer for a good or service. The mobile device of the customer can present a customer contribution option that can allow the customer the option of making a customer contribution to a customer portfolio of multiple charities, wherein the portfolio is stored in the server. In some embodiments, the mobile device can comprise software that links a debit or credit card to the payment system. In other embodiments, the mobile device is the credit or debit card that is linked to the payment system.

The provided donor facilitation system can also include an electronic device of the retailer that is in communication with the server and allows the retailer to match or exceed the customer contribution option of the customer with a retailer contribution to the customer portfolio. In some embodiments, the customer contribution of the customer and the retailer contribution of the retailer can be stored in a donor advised fund. In some embodiments, the retailer can make a retailer contribution directly to charities in the customer portfolio.

In another aspect, a method of facilitating donations using a computing system is provided that includes at least one server to host a payment system and at least one computing device communicably coupled to the at least one server through a communication network. The method can include a retailer charging a customer a price and the customer making an electronic payment for the price through the at least one computing device. The at least one computing device can present an customer contribution option to the customer and the customer contribution option can be to a customer portfolio of multiple vetted charities. The customer contribution option can be to a customer portfolio of multiple charities. The customer can select the customer contribution option and can select an amount for a customer contribution to the portfolio through the at least one computing device. The customer can make the electronic payment for the price and amount of the customer contribution through the at least one computing device. The customer contribution can be stored in a donor advised fund and the retailer can make a customer contribution to the customer portfolio of multiple charities.

In yet another aspect, a method of facilitating donations using a computing system is provided that includes at least one server to host a payment system and at least one computing device communicably coupled to the at least one server through a communication network. The method can include a retailer charging a customer a price. The customer can make a payment for the price through the at least one computing device. The at least one computing device can present a customer contribution option to the customer wherein the customer contribution option is to a customer portfolio of multiple vetted charities. The customer contribution option can happen automatically upon the customer's purchase of the good or service by the customer having previously selected this option, or the customer can select the customer contribution option and can select an amount for a customer contribution to the portfolio through the at least one computing device. The customer can make the electronic payment for the price and amount of the customer contribution through the at least one computing device wherein the customer contribution is stored in a donor advised fund. Finally, the retailer can create a retailer portfolio comprising multiple vetted charities.

The provided donation facilitation system can allow a donor, such as a customer, to challenge another entity, such as a retailer, to make an retailer contribution to a portfolio of multiple charities set up by the donor upon, for example, the purchase of a good or service from the retailer. The provided portfolio donation facilitation system can allow the other entity such as a retailer to create its own retailer portfolio of vetted multiple charities and make an retailer contribution to a customer's portfolio of vetted multiple charities when at least one component of the retailer's portfolio of vetted multiple charities matches at least one component of the customer's portfolio of vetted multiple charities.

In this disclosure the term:

"retailer contribution" refers to an extra payment made by the retailer to the customer's portfolio of vetted charities;

"additional contribution" refers to an extra payment made by a customer or consumer to the customer's portfolio when making a purchase from a retailer;

"customer portfolio" refers to a collection of multiple vetted charities set up by a customer or consumer that typically includes from about 1 to about 10 or even more vetted charities and is stored in a system server;

"donor advised fund" refers to a dedicated fund, often associated with a financial institution, that collects and stores donations to portfolios (and can earn interest or be a charity itself) and then can distribute or split the donations among the charities in the portfolio according to the rules for distribution of donations to portfolios;

"electronic device" refers to and can be used interchangeably with the term, "mobile device";

"mobile device" refers to smart phones, tablets, laptop computers, or any other portable computing device;

"price" refers to the amount of money that is expected by a retailer from a customer or consumer to pay for a desired good or service. Typically, the price is posted by the retailer or provider and is the undiscounted, regular price of the good or service;

"retailer" refers to an entity that offers goods or services for a price or fee to a customer or consumer. Additionally, a retailer can be a bank or savings institution that offers a discount, donation to a customer's charity, or extra compensation from, for example, a prize or incentive to use that institution;

"retailer portfolio" refers to a collection of multiple vetted charities set up by a retailer or service provided that typically includes from about 2 to about 10 vetted charities (or even about 60,000 vetted charities if, for example, using Apple-Pay®) and is stored in a system server;

"rounded-up" or "round-up" refers to the process of agreeing to pay a price for a good or service and then adding an additional amount (for charitable purposes) to the price to the next dollar or a higher payment amount;

"rules for distribution of donations to portfolios" refers to predetermined splits with predetermined ratios for disseminating funds amassed by portfolios into the vetted charities contained in that portfolio;

"vetted charity" refers to a charity that has been determined to not be fraudulent perhaps by using an outside vendor or watchdog group.

The above summary is not intended to describe each disclosed embodiment of every implementation of the present disclosure. The brief description of the drawings and the detailed description which follows more particularly exemplify illustrative embodiments. In the drawings, the layers are not necessarily drawn to scale.

DETAILED DESCRIPTION

Figure 1:
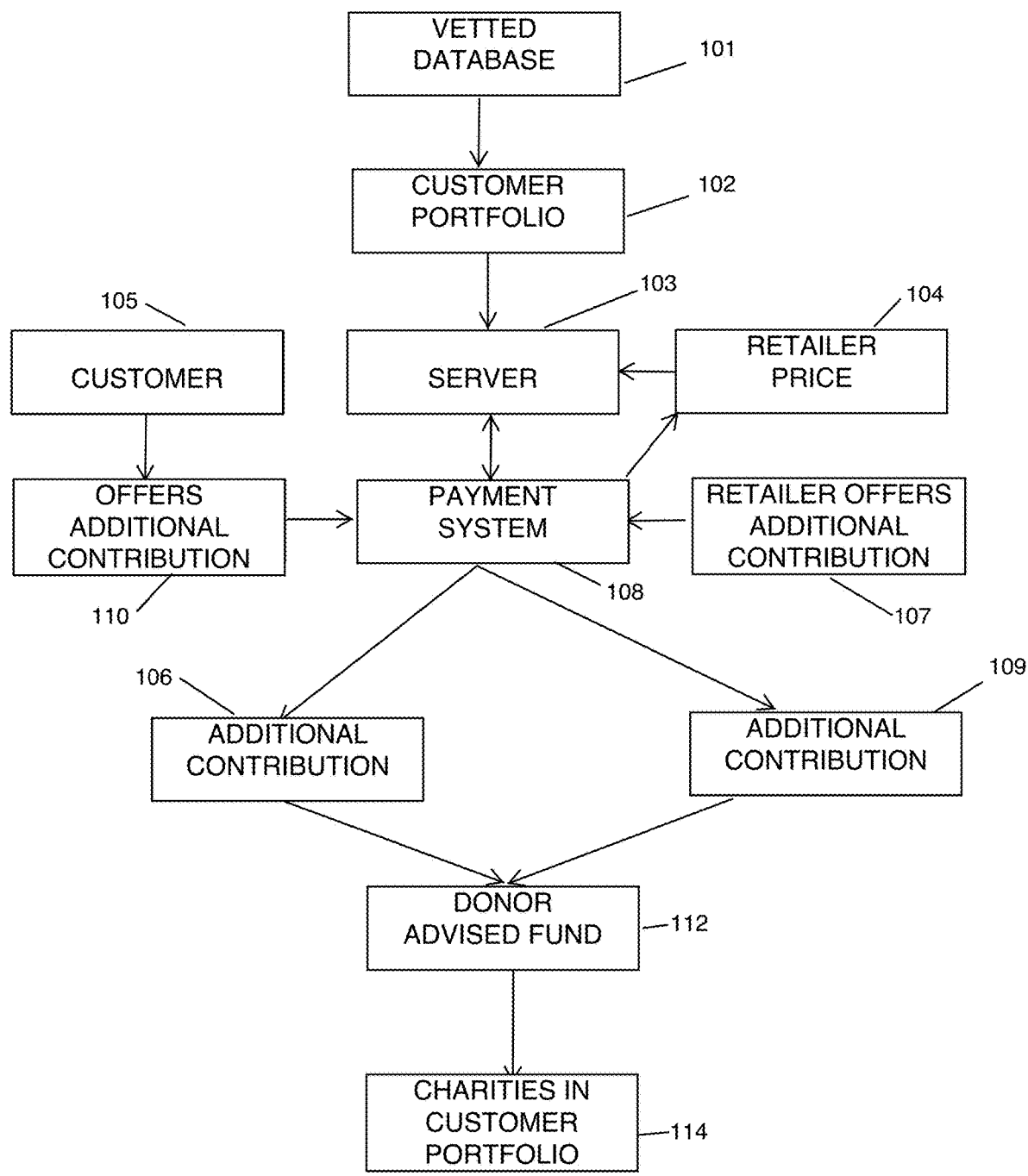
FIG. 1 is flow chart of one embodiment according to the provided disclosure where the customer challenges the retailer to make a donation to the customer's portfolio.

Various customer interfaces and embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

Retailers often ask customers or consumers if they would like to round-up a purchase of a good or service to the nearest dollar for a charity selected by that store. However, this can be an unfulfilling experience for the retailer or the customer for a number of reasons. First, the customer may not care about the charity selected by the store for the retailer contribution. Second, it is rare that confirmation is received that the donation ever makes it to the charity. Lastly, the verbal back-and-forth with the retailer can take time and can be annoying or embarrassing.

The system presented herein turns this system upside down by empowering the customer to challenge the retailer to round-up for the consumer's charity of choice, or portfolio of charities. The provided system also sends a notification to both the retailer and the consumer when the donation is eventually made to the end charity or portfolio of charities. In the provided system, the charitable transaction can occur automatically in a digital conversation that can happen in the background. Essentially, the retailer can reward the customer for their business by donating to a charity or portfolio of charities of the customer's choice.

In some embodiments, the system disclosed in the provided disclosure may be incorporated directly into a digital wallet on a mobile device. In other embodiments, the provided disclosure may be a standalone application on a mobile device that interfaces with a digital wallet or links to a real credit card. The provided system allows the consumer to can aggregate donations in a charitable portfolio. The provided system can allow the consumer to make a single donation that is distributed to multiple charities at the same time. The system further permits various means of communication, including social media communication and notification, related to donation and aggregation activity.

Copending U.S. patent application Ser. No. 15/181,781, filed on Jun. 14, 2016 (Soderstrom) discloses a "METHOD AND SYSTEM FOR FACILITATING DONATIONS". In this application a method and system are disclosed that allows using a computer system that includes at least one server and at least one computing device, that can be a mobile device, to communicably couple the server to the device through a communication network. In some embodiments, the method includes a retailer charging a customer a price, the customer offering to make an electronic payment for the price through the computing device, the computing device presenting and customer contribution option to the customer, the customer selecting the customer contribution option, either upon activating the technology, or the technology executing prestored payment option, and making the customer contribution to a donor advised fund. In some embodiments, the customer contribution is a "rounded-up" amount that the customer adds on to the retailer's price with the intention that it will be directed to a charity of the customer's choosing. Copending U.S. patent application Ser. No. 15/181,781 is herein incorporated by reference in its entirety.

Copending U.S. patent application Ser. No. 16/532,874 (also, Soderstrom) filed on the same day herewith, discloses a "PORTFOLIO CHARITABLE GIVING SYSTEM" that discloses a method and systems of facilitating donations that includes a donor making a charitable donation to a portfolio that includes multiple vetted charities set up by a customer or donor that, in some embodiments, can be a customer or consumer. The method and system include rules set up by the donor for distributing the charitable donation among the vetted charities in the portfolio in a single step at a predetermined time. The rules can be changed by the donor as well as the make-up of the portfolio of vetted charities.

The provided disclosure relates to systems and methods that allow a customer or consumer to challenge a retailer to contribute to, match, or exceed a customer contribution (in addition to the price) made to a portfolio of vetted charities. The customer can direct an customer contribution to be made to the customer's portfolio of vetted multiple charities and then can "challenge" the retailer to make an retailer contribution. Typically, the customer contributions and retailer contributions are held in a donor advised fund. This fund, which can additionally be a charitable fund, is used to escrow the customer contributions and contributions to the customer's portfolio and collect them until, at a predetermined time as, for example, at the end of a week, a month, a quarter, a year, or any other time period, money in the donor advised fund is distributed to the vetted charities in the customer's portfolio according to rules that have been established by the curator of the customer's portfolio. Alternatively, the funds may be distributed directly to the end charities. The curator can be the customer him or herself, or another entity, which maintains the charitable portfolio by swapping charities in and out of the portfolio. In some embodiments, the curator can be or can act at the direction of a giving circle or group of people (or club) that come together to determine, as a group, sometimes by a vote, which charities to list in the portfolio.

A curator (who may be an individual such as a customer or a retailer) can construct a portfolio that includes some of his or her favorite charities. In other embodiments, a portfolio can include a larger number of individual charities. In some embodiments, the charities can have a theme or be related in one way or another (for example, the charities can comprise local school PTA organizations or boy/girl scouts). In other embodiments, the portfolio can include charities with a theme such as environmental, medical research, philanthropic goal-oriented themes or others. In some other embodiments the charities are only related to each other in that they are selected by the curator for personal reasons.

In some embodiments, a donation facilitation system is provided that includes a server programmed and configured to host a payment system. The server can be in communication with a mobile device of a customer or consumer and also in communication with an electronic device of a retailer. The customer can be provided with an opportunity to make an electronic payment into the payment system of a price charged by a retailer for a good or service. The server can be in communication with a mobile device (such as a smart phone of the retailer or customer) or another electronic device (of either the retailer or the customer). In some embodiments, the server can host a payment system. Exemplary systems that can be useful in this disclosure include ChangeUp®, or Kickstarter® or other platforms that include electronic payment collection and distribution functions. The provided disclosure will focus on the ChangeUp® platform as an example but should not be construed to be limited only to this platform. There are many others.

In one embodiment presented herein, both retailers and customers can join the ChangeUp® platform and can create their own portfolios. The portfolio may hold anywhere from 1 to one million charities. In some embodiments, a customer may have a portfolio that has about 10 charities and a retailer may have a portfolio that has, for example, 61,212 charities ("all public high schools in America") plus all environmental organizations, and also the American Red Cross.

Then, by way of example, the ChangeUp® platform can allow these two portfolios to communicate with each other to determine if any of the charitable members of each of the two portfolios match. After a consumer has linked his payment method to the platform, the consumer can go out and use a payment method such as a credit or debit card. When the payment method is used at a retailer that has also joined the platform, the provided system can determine if the customer and the retailer share an affinity for at least one charity in their respective portfolios (or if there is a match between one or more charities in the customer's portfolio and the retailer's portfolio). If there is a match of at least one or more charities in each portfolio then the retailer will be notified via a report that funds will be withdrawn from the retailer's linked payment method account and sent to that particular charity on behalf of the customer. In some embodiments, rules can be set up by either the customer or the retailer that more than one charity needs to match before the funds are transferred.

In the provided but not limiting example, ChangeUp® can compare the portfolio of the customer and the portfolio of the retailer to find one or more matches. If there are one or more matches then ChangeUp® may add customer contributions or retailer contributions based upon rules or rankings set up and applied by the consumer and the retailer, individually, on each of their respective portfolios. If a match is found, then funds can be transferred from the retailer into a donor advised fund that will hold the funds until they are distributed to the respective charities in common with both portfolios according to the distribution frequency and rules set up for the platform.

Retailers may show a physical symbol or sticker that announces the ability for a customer to utilize the present invention at that retailer's place of business and therefore partner with that retailer (in a way) support their customers' portfolios of charitable contributions. Additionally, retailers can support their own portfolios of charitable organizations for reasons such as attracting customer to their products, pursing their own altruistic goals, or to decrease their tax liability.

It is also contemplated that banks and/or savings institutions can offer customer contributions to charities of the customer's choice in order to attract additional business.

In some embodiments, a retailer may have a non-profit organization or fundraising campaign that it supports (for example, the Red Cross), and a customer can elect to donate rounded up amount to the retailer's campaign, and/or split the rounded-up amount between the retailer's campaign and the customer's campaign.

In another embodiment, the customer can designate or be notified by specific merchants in advance and receive location-specific messages (via GPS, Wi-Fi, or other location technologies), offers or benefits when in proximity to a retailer participating in the program. The customer can also designate certain non-profits or charitable institutions whose location may trigger similar notices or messages. Thus, the customer on foot could be alerted to the existence of a retailer or non-profit and engage in a purchase, yielding additional savings, or make a donation.

A customer may assign identifier such as a name, number, or moniker to the customer's personal fundraising cause. That number is associated with that customer's efforts to raise money. The customer can utilize that name or number to recruit friends to a particular fundraising campaign. This can also cause location-specific notices to be sent to friends when they are in physical proximity to a participating retailer or designated non-profit.

In some embodiments, the rounded-up amount may be incorporated into an online retail store and catalogue where customers can round up their purchases, but also share with others their own "store" on social networking sites that promote products they like.

In some embodiments, the provided disclosure can track the spending habits of an individual instead of, or in addition to, operating as a payment system. The system can read the individual's payment or donation history and can offer analyses of the data, such as amount spent over the previous week, month, year, etc. In some embodiments, the disclosed system and method can be integrated with social media and social networking sites. The system can be a social media platform that uses an algorithm to measure, accumulate, and direct customers' transactional round-ups on purchases into fundraising campaigns.

The integration of the disclosed system and method with social networking sites can allow customers to lead, promote and contribute to fundraising campaigns using a previously designated character or combination of characters that is/are inter-operable with a mobile application or any other application that relates to the present invention, like a digital wallet application, and allows customers to automatically apply their rounded up amounts to a non-profit organization or fundraising campaign of their choosing. The rounded-up amounts may be applied on a one-time basis in some examples or may be applied for a specified period of time (i.e., one month).

In some embodiments, the disclosed application may send a notification to the donor or to the recipient of funds (for example, a non-profit organization or fundraising campaign) when funds are donated using the system. These notifications may be sent to a customer or fund recipient through a social network, such as Twitter or Facebook, or may be sent by other delivery routes such as email or text message. Updates to a customer's social networking profile related to the present invention can be done in any way that is allowed by the social networking site, for example by use of a personal computer, smart phone or other mobile device.

The present disclosure can also be used in social media to facilitate gamification of fundraising campaigns. More specifically, the invention can not only provide technology that allows customers to round-up their purchases, but also can bundle those round-ups into a larger marketplace that can assigns values and can directs those values to a specific campaign.

For example, a customer can choose a specific organization or a general category, such as climate change, for a fundraising effort to which they want to donate. If the customer chooses to donate to a general category, the specific organization that will receive the donation can be dependent upon the organization's social media presence, with the organization that receives the most social media attention being the organization that also receives the most, or all, of the general category donations.

In one embodiment, customers can elect, at the time of the donation, whether or not their donations are subject to the various competitions or challenges. Alternatively, customers can opt out of the competition and simply assign their donations to a single cause of their choice. In another embodiment of the competition or challenge, customers may be able to create a one on one competition, wherein each customer supports a specific organization and the customers attempt to increase their representative organization's scores by having other customers donate to one of the two organizations in the competition. One example of where this type of competition could be especially effective is when public figures, such as celebrities, engage in a public competition to bring awareness to causes and to foster friendly competition among fans. In one embodiment, at the end of the competition, the organization that has the highest score can win the other organization's accumulated donations.

In a further embodiment, concerts, sporting events, and retail outlets can compete against each other to send all of their round-ups to pre-chosen causes. For example, all National Football League (NFL) stadiums in a given day can compete against each other to see which stadium's fan base can bring the most attention to a local cause on social media. The stadium that ends the competition with the greatest number of points (for example, by using a formula similar to the one described above) can win all of the round-up donations for that week.

In one embodiment, leaderboards can be created for individual customers. For example, each customer can be rated according to the total number or total value of round-up donations the customer generates and the amount of social media interactions the customer receives. The individual leaderboard can be determined using a formula similar to the variations described above. Customers can then compete against each other to generate the greatest number or value of round-up donations for a particular cause, such as, but not limited to, an alma mater, non-governmental organization, political campaign, hospital campaign, etc. In one embodiment, as motivation, the top ten leaders on each leaderboard for each category of cause can get special treatment from that cause.

In some embodiments, customers can track their donations and voluntarily donate to their campaign even if they are not making a purchase. This may enable a customer to be placed on a leaderboard or be placed further up on the leaderboard for a specific month. By enabling competitive donations, the system may encourage individuals to share leaderboard news on social media and/or challenge others. In some embodiments, if a customer is a leader over a predetermined amount of time (i.e., twelve months), the customer can be rewarded.

In one embodiment, customers who have amassed a pre-defined threshold of round-up donations or who have become top customers through the leaderboard can operate as "bundlers". Bundlers can be trusted leaders in the donation community who are eligible to receive the round-up donations from other customers who trust the bundler to disperse the funds wisely. Further, a bundler can receive a small commission for each customer the bundler invites to use the system, thus building the bundler's value with every customer recruited.

In some embodiments, bundlers can operate as a form of electoral college, wherein all of the bundlers' constituents move round-up donations through them. This can infuse the provided system with politics, competition, and lobbying that allows for dynamic interactions. If a customer does not want to be involved in this type of system, however, the customer can opt out of the leaderboard feature and simply engage as a standalone experience where the customer has a direct relationship with the cause the customer is benefitting. This would be appropriate if a customer was donating to, for example, a grandchild's college fund.

Millions of people may round up amounts on purchases daily, therefore contributing large amounts of monies into a central holding fund, which may operate as a bank of sorts, or a mutual fund that grows, earns interest, and delivers dividends. Therefore, a customer can "donate" to his or her own account in order to save or invest money.

In some other embodiments, another party such as a foundation may also participate in the customer challenging a retailer and may add an additional contribution to the customer's portfolio, perhaps as an incentive to shop at the retailer.

In another embodiment, customers may compete with each other in a contest for the greatest number of contributions per time period, the largest sum total of contributions per time period, or other statistics related to use of a customer challenge. Additionally, a "lottery" type of system can be used such as picking a number of contributions that would be the winner in any given time period. These competitions or lotteries can have retailer contributions to the charity or to the customer as a prize and can be used as an incentive to promote use of the customer challenge system.

As noted, the provided system and methods can work in combination with existing digital wallet applications or be its own digital wallet application with the round-up functionality and social network engagement embedded therein.

Turning now to the Figures which exemplify parts of the provided system and methods, FIG. 1 is flow chart of one embodiment according to the provided disclosure where the customer challenges the retailer to make a donation to the customer's portfolio. Vetted databases 101 are used as the source of charities are selected by the customer for inclusion in customer's portfolio 102. The list of charities can be vetted by a third party, by a process that eliminates organizations that engage in criminal, unethical, or otherwise undesirable practices. One exemplary third-party organization that can be used for vetting is the Southern Poverty Law Center. The vetted charities, known as the net number of charities, can then be used by the user or donor to create a personalized portfolio. These can be for national, regional, or local charities such as, for example, listing well-known charity organizations such as the National Audubon Society or the American Cancer Society, lesser known and more localized charities such as the Los Angeles branch of the Humane Society, or very localized charities such as the PTA of a local school. These charities can be selected to create a personalized portfolio for each charitable donator. Other examples of custom portfolios are discussed below.

Customer portfolio 102 is stored in server 103 and is in communication with a payment system stored therein. Retailer 104 offers a good or service for a price. Customer 105 wishes to purchase the good or price from the retailer through payment system 108. In one embodiment, customer 105 can offer to pay the price along with a customer contribution (which may be a round-up to the nearest dollar) as shown in 106. Payment system 108 which is in communication with server 103 takes the payment 106 from the customer and then pays the price to retailer 104. Retailer 104 has also offered to customer 105 to pay an retailer contribution 109 through payment system 108. The customer contribution 110 offered by customer 106 and the retailer contribution offered by retailer 104 are then transferred from payment system 108 to a donor advised fund 112 and then eventually paid to the charities in customer portfolio 102 according to rules set up for the distribution of funds to the individual charities in the customer's portfolio. In FIG. 1 customer accesses server 103 and payment system 104 through a mobile device. Retailer uses an electronic device to also access server 103.

Figure 2:
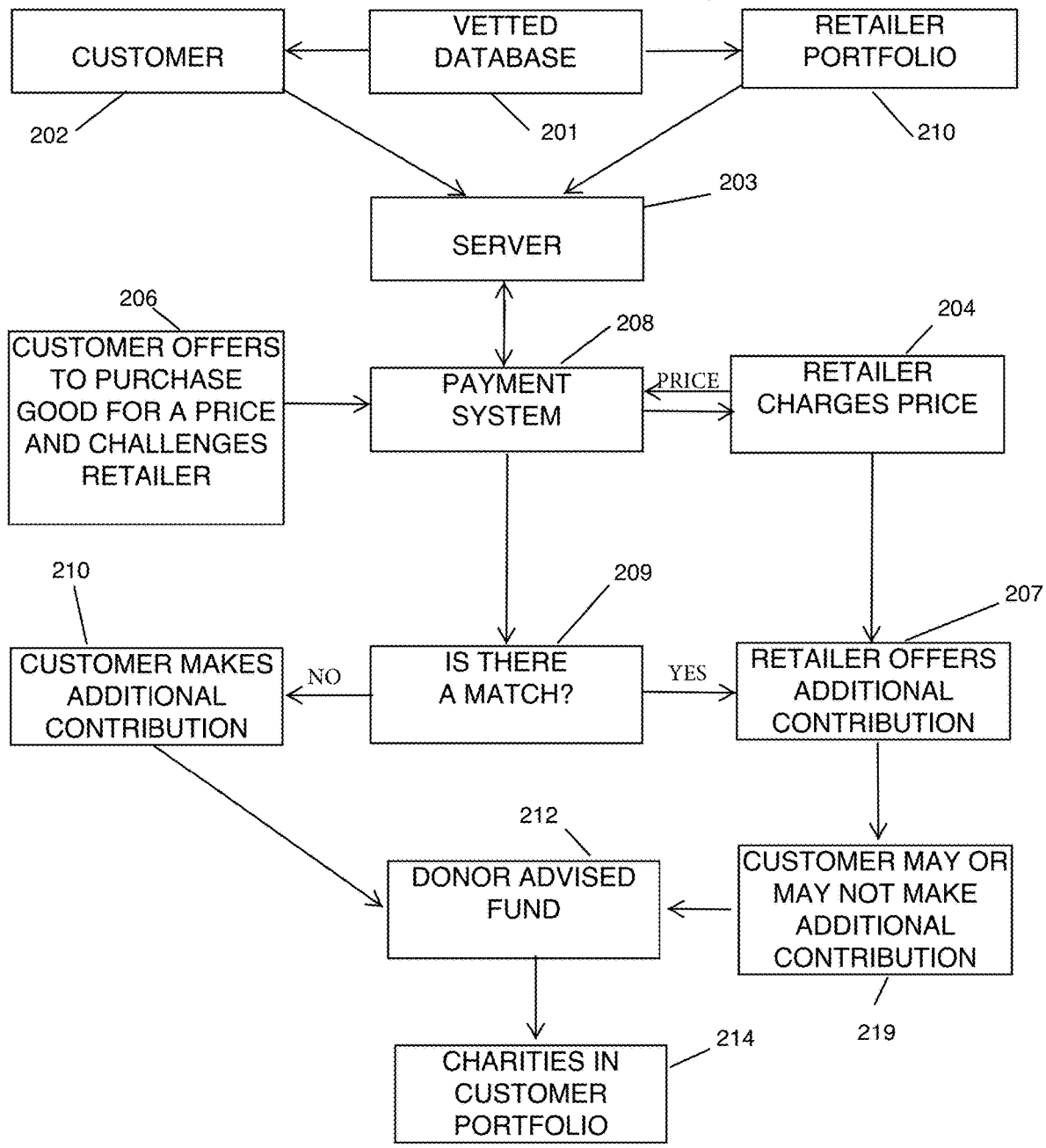
FIG. 2 is a flow chart of another embodiment according to the provided disclosure where the customer challenges the retailer to make a donation to the customer's portfolio if there is a match between at least one charity in the customer's portfolio and the retailer's portfolio.

FIG. 2 is a flow chart of another embodiment according to the provided disclosure where the customer challenges the retailer to make a donation to the customer's portfolio if there is a match between at least one charity in the customer's portfolio and the retailer's portfolio. In FIG. 2, a consumer portfolio 202 and a retailer portfolio 210 are assembled from vetted database 201 and both are stored in server 203. In the system illustrated in FIG. 2, retailer 204 offers a price for a good or service through payment system 208. Customer 206 offers to buy the good or service offered by retailer 204 for a price charged by retailer 204 and challenges retailer 204 to offer to make a retailer contribution 207 to donor advised fund 212 if there is a match 209 between at least one member in retailer portfolio 210 and customer portfolio 202. If there is no match, customer 206 can still make a payment to retailer 204 for the good or service through payment system 208 and can still have his own customer contribution to his donor advised fund 212. However, the customer may decide not to purchase anything unless there is a match of at least one member of customer's portfolio and retailer's portfolio. If there is a match 209 then customer may or may not make an additional contribution 210. Retailer 207 makes a retailer contribution to customer's donor advised fund 212 that is in addition the customer contribution to that fund. In some embodiments, the retailer can offer to give a contribution to the customer's portfolio if, for example, the customer agrees to buy from the retailer or for any other promotional reason.

Figure 3:
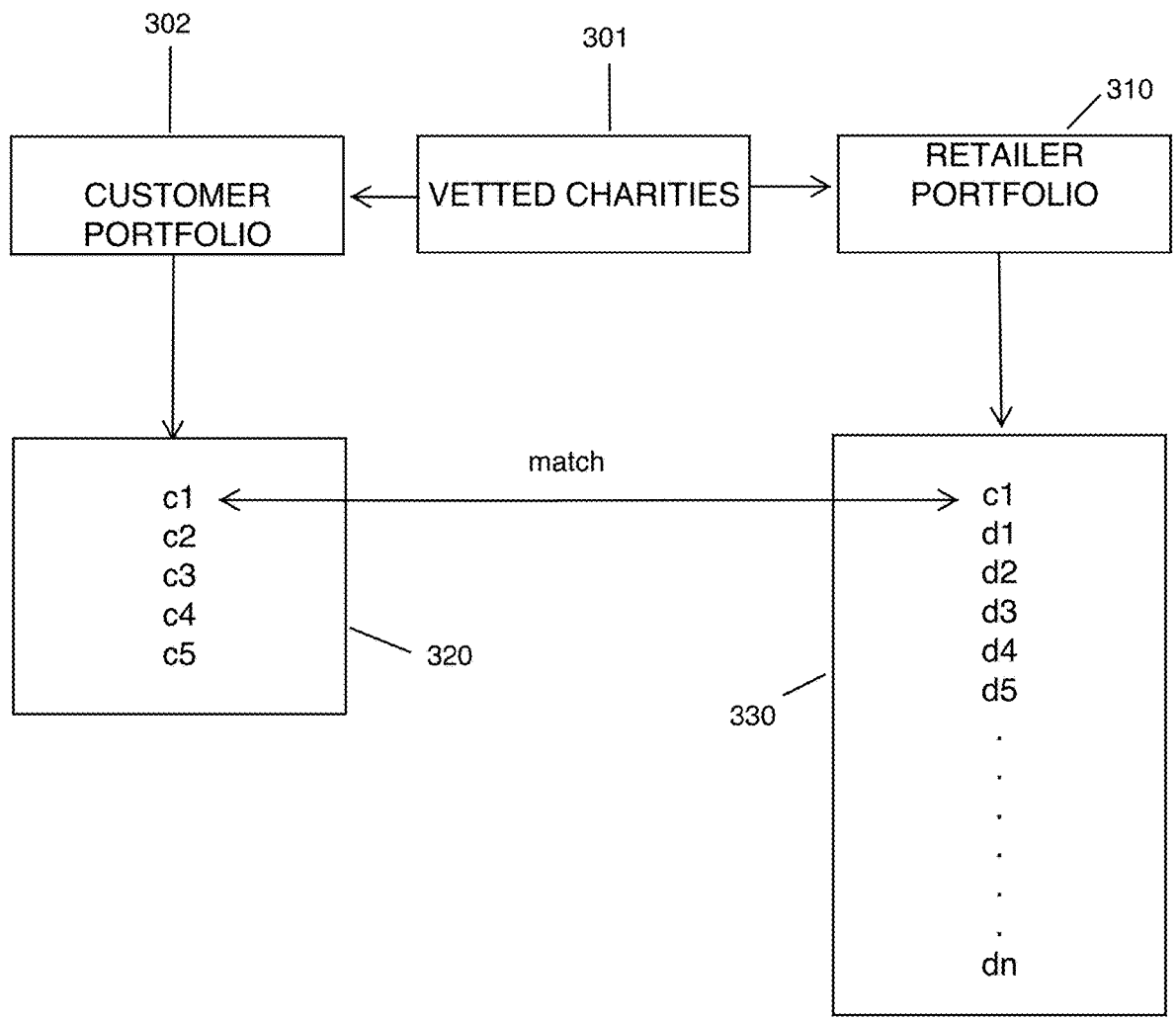
FIG. 3 is flow chart showing matching between at least one member of a customer's portfolio and at least one member of a retailer's portfolio.

FIG. 3 is flow chart showing matching between at least one member of a customer's portfolio and at least one member of a retailer's portfolio. In FIG. 3, customer portfolio 302 has charities (c1, c2, c3, c4, and c5) selected from vetted charities 301 as shown in 320. Similarly, retailer portfolio 310 has many more charities selected from vetted charities 301. In the exemplified case retailer portfolio includes (c1, d1, ..., dn). Since both customer portfolio 320 and retailer portfolio 330 have one of the same charities, namely cl, there is a match in this embodiment.

Figure 4:
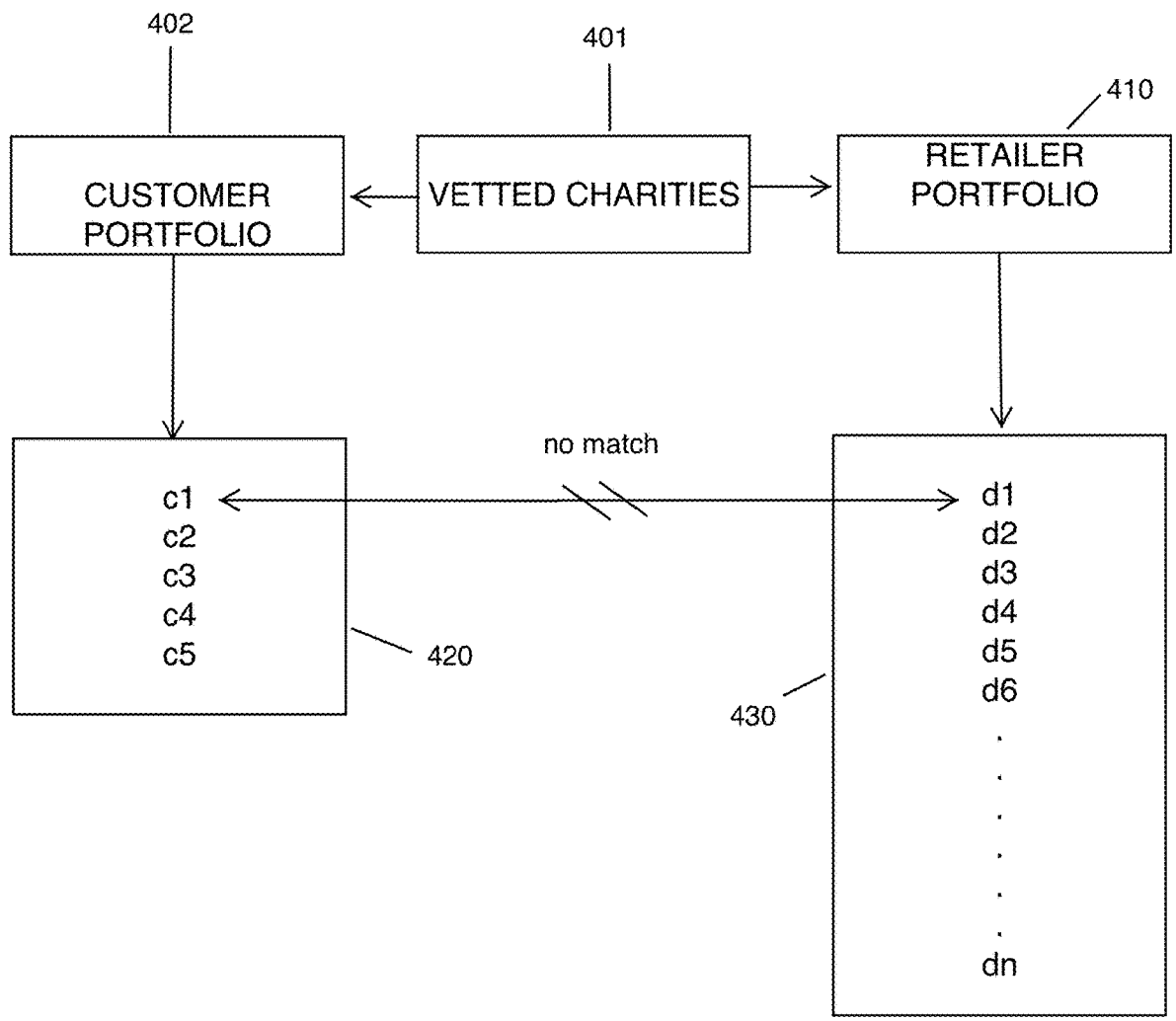
FIG. 4 is flow chart showing no matching between at least one member of a customer's portfolio and at least one member of a retailer's portfolio.

FIG. 4 is flow chart showing no matching between at least one member of a customer's portfolio and at least one member of a retailer's portfolio. In FIG. 4, customer portfolio 402 has charities (c1, c2, c3, c4, and c5) selected from vetted charities 401 as shown in 420. Similarly, retailer portfolio 410 has many more charities selected from vetted charities 401. In the exemplified case retailer portfolio includes (d1, ..., dn). Since neither customer portfolio 420 nor retailer portfolio 430 have any of the came charities, there is no match in this embodiment.

Figure 5:
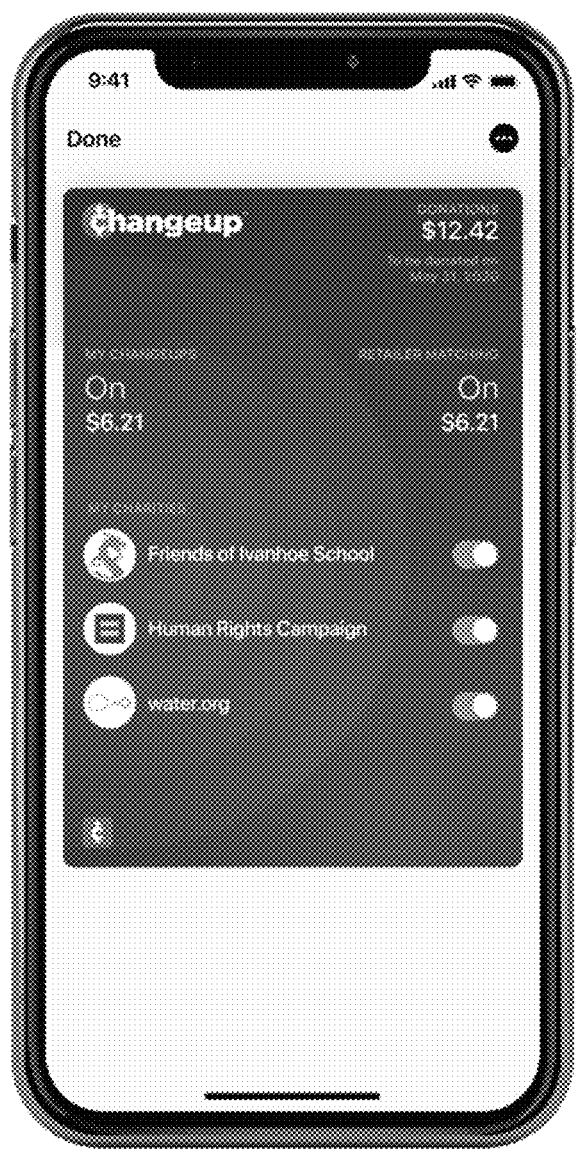
FIG. 5 is a screen shot of an exemplary embodiment of the present disclosure of a customer's portfolio that includes three charitable organizations.

FIG. 5 is an iPhone screen shot of an exemplary embodiment of the present disclosure of a customer's portfolio that includes three charitable organizations. The screen shot in FIG. 5 uses the ChangeUp® app on an iPhone and shows one customer's portfolio that includes three vetted charities—Friends of Ivanhoe School, Human Rights Campaign, and water.org. In this embodiment, to date the customer has made a $6.21 customer contribution to his portfolio and multiple retailers have made a similar $6.21 retailer contribution to the customer's portfolio as shown in the total of $12.42 donated to the portfolio by both donations.

Figure 6:
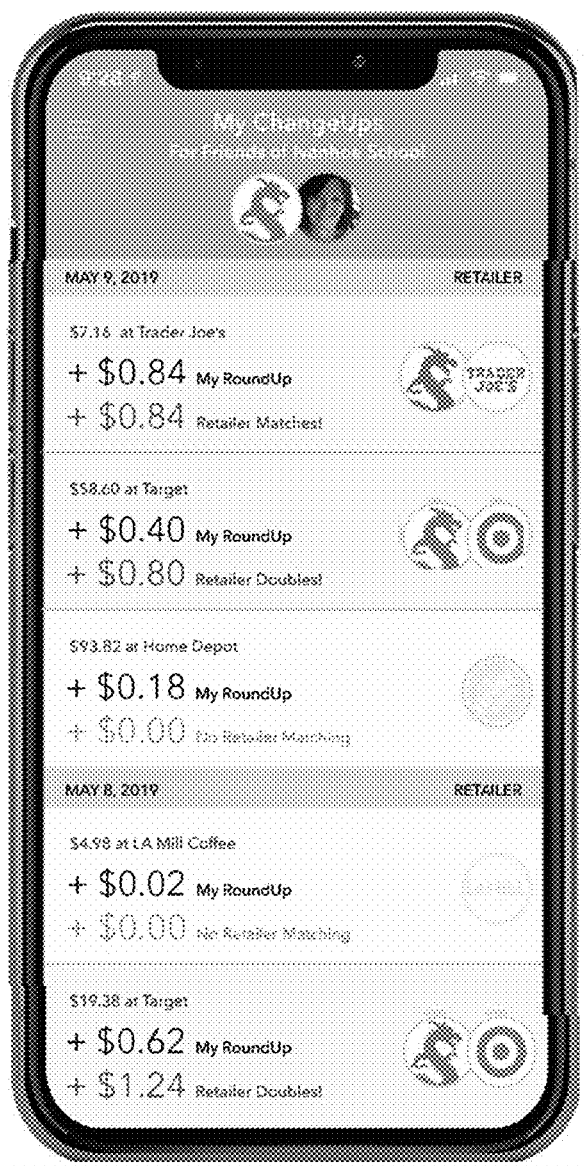
FIG. 6 is a screen shot of an exemplary embodiment of the present disclosure of a portfolio match between a customer's portfolio and a retailer's portfolio.

FIG. 6 is an iPhone screen shot of an exemplary embodiment of the present disclosure of a portfolio match between a customer's portfolio and a retailer's portfolio. In FIG. 6, a customer has a portfolio that contains only one vetted charity. That portfolio (named Friends of Ivanhoe School) has received donations on two different dates, May 8, 2019 and May 9, 2019. On May 8, the customer made two purchases—one for $4.98 to LA Mill Coffee. There was not match between retailer's portfolio and the customer's portfolio, so no retailer contribution was made. However, the customer rounded-up the price of a cup of coffee that caused $0.02 to be put in her donor advised fund. In some embodiments, the rounded-up amount can be sent directly to the customer's charity. In another purchase on the same day, $19.38 was spent at Target and this time, the customer added $0.62 by rounding-up her purchase. Target had a special double match for that transaction and also matched its portfolio with customer's portfolio (both had Friends of Ivanhoe School as respective portfolio members). In this case $0.62 (from customer contribution) and $1.24 (from retailer's double match), or a total of $1.86 was sent to customer's donor advised fund for contribution to customer's charity. In some embodiments, portfolio matching can be offered as a percentage of the purchase and be offered to the customer to be added to his portfolio of charities as, for example, 5% cash back and presented as a round-up.

On May 9, three transactions are shown in the screen shot of FIG. 6. In the first two (Trader Joes and Target) portfolio matches were found between customer's portfolio and retailer's portfolio so matches were made to the customer contribution round-up and retailer's retailer contribution. In fact, Target still matched customer contribution with a double retailer contribution. In the last transaction of that day only the customer's round-up payment was made since Home Depot did not have a portfolio match with the customer.

Figure 7:
FIG. 7 is a screen shot of an exemplary embodiment of the present disclosure showing three customer match transactions on May 9, 2019 and one customer match and two customer nonmatches on May 8, 2019.

FIG. 7 is an iPhone screen shot of an exemplary embodiment of the present disclosure showing three customer match transactions on May 9, 2019 and one customer match and two customer nonmatches on May 8, 2019. FIG. 7 shows most of the same transactions made on May 8 and May 9. In this exemplary screen shot three round-up transactions were made by the customer to LA Mill Coffee, Banana Republic, and Target. This screen shot shows the amount contributed by the customer (and, in the case of Banana Republic a retailer contribution) to customer's donor advised fund. The total amount spent at these three businesses is also tracked in this screen shot. Similarly, on May 9 three transactions were made a Trader Joes, Target, and Home Depot. The retailers all matched the customer's contributions with retailer contributions (and, in the case of Target they doubled the match). Again, the total spent at these three businesses is tracked.

Figure 8:
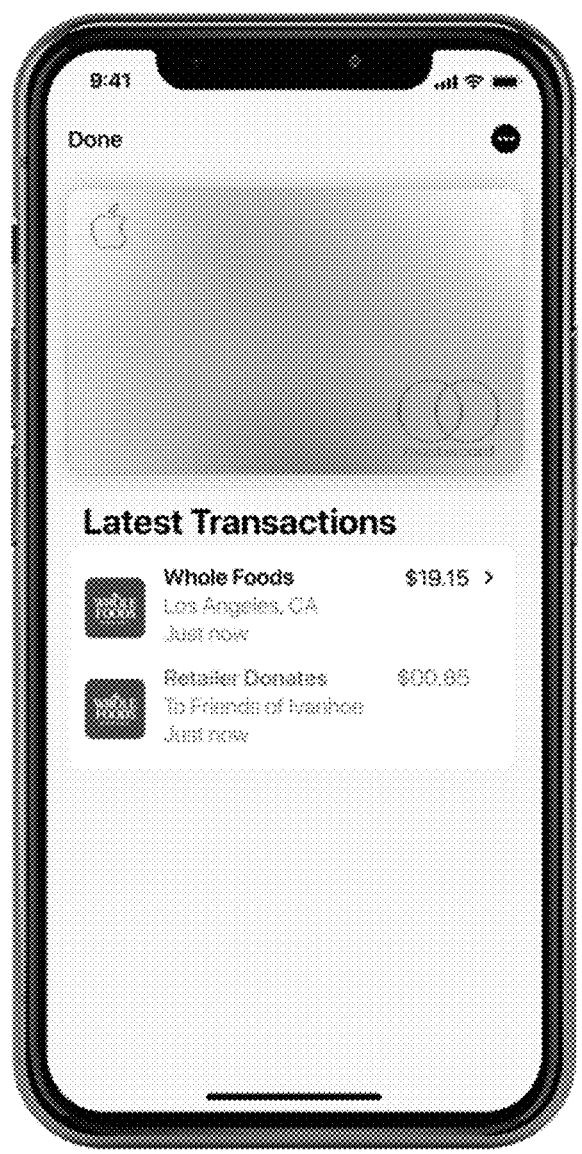
FIG. 8 is a screen shot of an exemplary embodiment of the present disclosure showing a transaction that includes a retailer donation to one or more charities in the customer's portfolio.

FIG. 8 is an iPhone screen shot of an exemplary embodiment of the present disclosure showing and transaction that includes a retailer donation to the customer's portfolio. This screen show shows a transaction of $19.15 made to Whole Foods and a donation of $0.85 to customer's portfolio (that contains one charity, Friends of Ivanhoe). In this example, only the retailer has made a contribution to the customer's charity or portfolio of charities. The customer has not made his or her own rounded-up donation.

Figure 9:
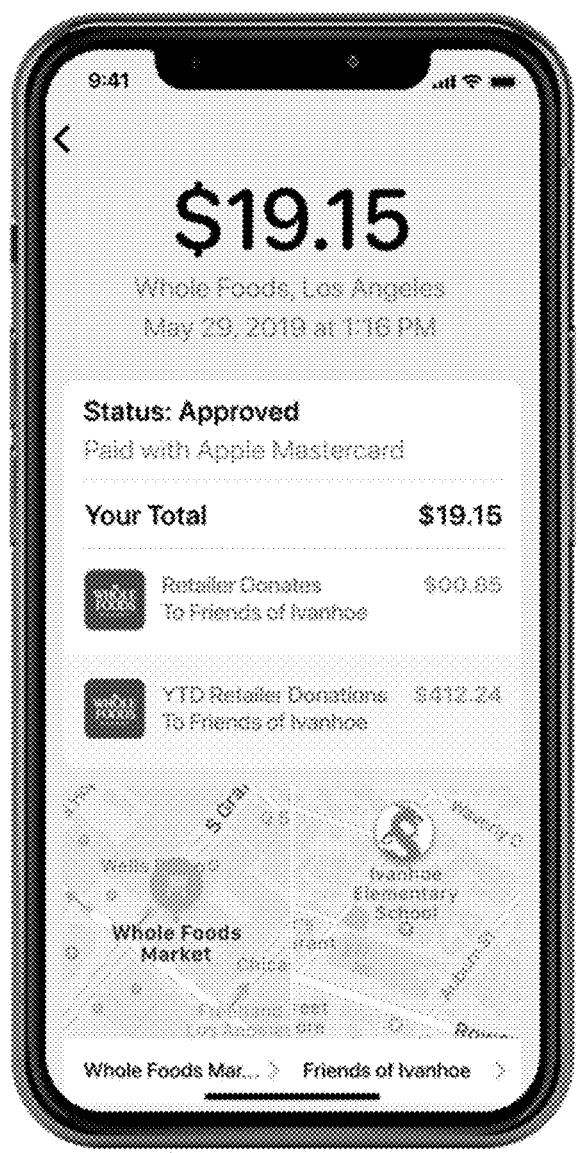
FIG. 9 is a screen shot of an exemplary embodiment of the present disclosure that shows a year-to-date report of the contributions of a retailer to one or more charities in a customer's portfolio.

FIG. 9 is an screen shot of an exemplary embodiment of the present disclosure that shows a year-to-date report of the contributions of a retailer to a customer's portfolio. This screen shot (paid with credit card) shows that a year-to-date (YTD) total of $412.24 has been made on behalf of multiple consumers in a circle giving group.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A donation facilitation system comprising:
a server programmed and configured to host a payment system, wherein the server comprises a portfolio of customer vetted charities, and wherein the server also comprises a portfolio of retailer vetted charities;
a mobile device of a customer in communication with the server that is configured to present the customer an opportunity to make an electronic payment into the payment system of a price charged by a retailer for a good or service,
wherein the mobile device presents a customer contribution option that allows the customer to make a customer contribution amount to the customer portfolio of vetted charities;
a challenge from the customer to the retailer to match or exceed the customer contribution amount to the customer portfolio of vetted charities;
an electronic device of the retailer that is in communication with the server and allows the retailer to access the customer portfolio stored in the server to determine if one or more of the multiple vetted charities in the customer portfolio are vetted charities to which the retailer would like to contribute; and
a retailer contribution made by the retailer to the customer portfolio in response to the challenge.

2. A donation facilitation system according to claim 1, wherein at least one of the customer contributions of the customer and the retailer contribution of the retailer is stored in a donor advised fund.

3. A donation facilitation system according to claim 2, wherein retailer accesses the customer portfolio stored in the server to determine if one or more of the multiple vetted charities in the customer portfolio are vetted charities that the retailer would like to contribute the customer contribution.

4. A donation facilitation system according to claim 2, wherein the retailer makes a retailer contribution to the donor advised fund only if at least one vetted charity in the customer portfolio matches at least one vetted charity in the retailer portfolio.

5. A donation facilitation system according to claim 1 further comprising a report wherein the report is stored in the server and is distributed to the customer and the retailer.

6. A donation facilitation system according to claim 1, wherein the customer contribution option is presented automatically to the customer.

7. A donation facilitation system according to claim 1, wherein the mobile device comprises software that links a debit or credit card to the payment system.

8. A donation facilitation system according to claim 1, wherein customer contributions or retailer contributions are made based upon rules or rankings set up and applied by the consumer and the retailer on each of their respective portfolios.

9. A donation facilitation system according to claim 1, further comprising a leaderboard that is accessible to both the customer and the retailer.

10. A method of facilitating donations using a computing system that includes a server programmed and configured to host a payment system, wherein the server comprises a portfolio of customer vetted charities and a portfolio of retailer vetted charities and,
wherein the mobile device is in communication with the server through a communication network, the method comprising:
a retailer charging a customer a price;
the customer making a payment for the price through the mobile computing device;
the mobile computing device presenting a customer contribution option to the customer, wherein the customer contribution option is to a customer portfolio of multiple vetted charities;
the customer selecting the customer contribution option and selecting an amount for a customer contribution to the portfolio through the mobile computing device;
the customer challenging the retailer to match or exceed amount selected by the customer; and
an electronic device of the retailer in communication with the server allowing the retailer to access the customer portfolio stored in the server to determine if one or more of the vetted charities in the customer portfolio are vetted charities to which the retailer would like to contribute;
the customer making the electronic payment for the price and amount of the customer contribution through the mobile one computing device;
and
the retailer making a customer contribution to the customer portfolio of multiple vetted charities in response to the challenge,
wherein the customer contribution is stored in a donor advised fund.

11. A method of facilitating donations according to claim 10, wherein at least one of the customer contributions of the customer and the retailer is stored in a donor advised fund.

12. A method of facilitating donations according to claim 11, wherein the retailer accesses the customer portfolio stored in the server to determine if one or more of the multiple vetted charities in the customer portfolio are vetted charities that the retailer would like to contribute the customer contribution.

13. A method of facilitating donations according to claim 10 further comprising a report wherein the report is stored in the server and distributed to both the customer and the retailer.

14. A method of facilitating donations according to claim 10, wherein the customer contribution option is presented automatically to the customer.

15. A method of according to claim 10, wherein the mobile device comprises software that links a debit or credit card to the payment system.

16. A method of facilitating donations according to claim 10, wherein customer contributions or retailer contributions are made based upon rules or rankings set up and applied by the customer and the retailer on each of their respective platforms.

17. A donation facilitation system comprising:
a server programmed and configured to host a payment system;
a mobile device of a customer configured to present the customer an opportunity to make an electronic payment into the payment system of a price charged by a retailer for a good or service,
wherein the mobile device of the customer presents a customer contribution option allowing the customer the option of making a customer contribution to a customer portfolio of multiple vetted charities, and
wherein the customer portfolio is stored in the server;
a retailer portfolio of vetted charities stored in the server;
an electronic device of the retailer that is in communication with the server that allows the retailer to match or exceed the customer contribution option of the customer with a retailer contribution to the customer portfolio, when the system matches at least one member of the customer's portfolio with at least one member of the retailer's portfolio; and a retailer contribution made by the retailer to the customer portfolio.

\* \* \* \* \*